United States Patent
MacArthur et al.

(10) Patent No.: US 7,203,172 B2
(45) Date of Patent: Apr. 10, 2007

(54) INTERNODAL ROUTING ENGINE FOR A NEXT GENERATION NETWORK

(75) Inventors: Glen MacArthur, Washington, NJ (US); Michael MacArthur, Point Pleasant, NJ (US); Randolph Mangoba, Ithaca, NY (US); Somit Ghosh, Piscataway, NJ (US)

(73) Assignee: Telcordia Technologies, Piscataway, NJ (US)

( * ) Notice: Subject to any disclaimer, the term of this patent is extended or adjusted under 35 U.S.C. 154(b) by 1107 days.

(21) Appl. No.: 10/256,969

(22) Filed: Sep. 27, 2002

(65) Prior Publication Data

US 2004/0062237 A1    Apr. 1, 2004

(51) Int. Cl.
*H04L 12/64* (2006.01)
(52) U.S. Cl. .................... 370/241; 370/352
(58) Field of Classification Search ........... 370/241, 370/352
See application file for complete search history.

(56) References Cited

U.S. PATENT DOCUMENTS 7,031,447 B2* 4/2006 Mani ............... 379/201.06
2006/0165015 A1* 7/2006 Melick et al. ........... 370/254

* cited by examiner

*Primary Examiner*—Melvin Marcelo
(74) *Attorney, Agent, or Firm*—Joseph Giordano; William A. Schoneman

(57) ABSTRACT

In a next generation packet based network a routing engine is used to determine the most cost effective route for a call from a caller/client subscriber to a call destination. The service manager or call agent softswitch, a call processor that controls the processing of calls, uses a table of softswitch node location information to determine the softswitch node in the service provider's network that is closest to the call destination. The location information related to the North American Numbering Plan (NANP) is also used to make this determination by providing the necessary location information on the call destination. The service manager the first receives the call then forwards the call through the packet backbone network of the service provider to the identified closest softswitch thereby reducing the need for use of the PSTN or another service provider's network.

16 Claims, 4 Drawing Sheets

INTERNODAL ROUTING ENGINE FOR A NEXT GENERATION NETWORK

FIELD OF THE INVENTION

This invention is related to a method and system for routing traffic in a telecommunications network that comprises both the traditional public switched telephone network (PSTN) and packet-switched transport next generation telecommunications network. More specifically, the method and system provides an improved way to route call traffic so as to maximize the use of the packet-switched next generation network thereby minimizing the costs associated with using TDM transports and circuit based switching as found the PSTN today.

BACKGROUND

The recent introduction and deployment of packet switched networks to carry voice traffic requires a new method of routing call traffic. Traditionally, voice call and analog data traffic has been routed from a central office connected to customer premises equipment (rotary telephones, touch-tone telephones, facsimile machines, analog modems or the like) to the PSTN which switches the call in accordance with the number dialed, thereby routing the call to a destination device connected elsewhere to the PSTN.

In the last decade there has been an ever-increasing build-out of packet-switched Next Generation Networks (NGNs) as opposed to traditional circuit-switched PSTN. There are now many telecommunications networks that are a hybrid of packet-switched and circuit switched networks. There are many ways to route call traffic in a heterogeneous environment composed of: (1) a service provider's softswitches (call agents) operating in conjunction with its packet backbone network; (2) traditional PSTN switches which may or may not be owned by the service provider; and, (3) call destinations (e.g., phones) within or outside the service provider's network. For example, call traffic may be routed from a service provider's subscriber immediately to the nearest available PSTN switch which may be owned by another service provider. there may be past traffic routing problems addressed to route calls within a traditional "PSTN" network, as well as separate problems addressed to route data over a packet (i.e. IP) network, there has been little work done on the need to depart from longstanding digit translation methodologies and introduce unique and new methods to intelligently route call (e.g. voice and analog data) traffic over a heterogenous network composed of a packet switched network and traditional circuit-switched PSTN networks. In addition, previous problems associated with routing data over a packet network operated at a "pure" IP layer where the algorithms did not have knowledge of the application (i.e. routing of calls). The recent introduction and deployment of packet switched networks to carry voice traffic traditionally carried by circuit switched networks presents a relatively new problem with regards to the determination of a simplified call processing translation routing composed of a packet switched network capable of carrying voice traffic.

All prior solutions utilize routing algorithms that operate at the IP layer. These solutions do not have any knowledge of the application that is using the transport. As such, it will typically utilize traditional "IP metrics" like Link State or Distance Vectors between Routers to control the Datagrams. Our solution does a higher level route computation, based on the called number, and the geographic location of the PSTN switches, and the Service Provider-owned Call Agents, thereby maximizing the usage of the packet network in the Service Provider's domain. This can be a major revenue booster for the network service provider.

All current routing algorithms in packet-switched networks now operate at "pure" IP layer where the algorithms do not have knowledge about the application. Realtime Transport Protocol ("RTP") is used for streaming realtime multimedia (including voice) over IP in packets. RTP, however, provides no knowledge of the physical location of the network node locations. Thus, a packet of voice data sent over a packet switched network may or may not arrive (i.e. egress) at the PSTN nearest the destination.

Therefore, it is desirable to have a method and system for the routing of calls within a heterogeneous network that can minimize the use of the PSTN and maximize the use of a service provider's packet switched backbone network so as to minimize call cost.

Furthermore, it is desirable to have a method and system for routing calls that uses information about the geographic location of nodes in the packet switched network in order to optimize the routing of packets to a node in the packet switched portion of the network nearest to the PSTN connection of the destination user.

SUMMARY

In accordance with the present invention, a method and system for routing calls over a heterogeneous network comprising packet switched and circuit switched PSTN networks takes advantage of the service provider's softswitches and packet backbone network by routing the call in such a way as to use as little of the traditional circuit switched PSTN resources as possible. By routing call traffic over the service provider's packet network, the costs associated with using an outside network would be minimized.

The present invention determines a simplified, optimal way of routing the call traffic as close as possible to the called party's location by minimizing the need to use the traditional circuit switched network elements that may not even belong to the service provider, while taking advantage of the service provider's more cost effective packet switched network.

In addition, within the service provider's network, the optimal route to direct call traffic from the calling party's softswitch to the softswitch closest to the called party's location is needed. The system and method determines an optimal, simplified, node-to-node call processing translation routing of calls in a packet network.

The method and system of the present invention, when implemented in a "class 5", "class 4" or "multi-class" softswitch, would enable the service provider to carry the maximum portion of a call on its own packet network with minimal use of the PSTN. The call would be handed over to PSTN at the softswitch node nearest to the PSTN switch serving the called party. By taking as much advantage of the service provider's packet network, the costs of having to use the more expensive, circuit switched, PTSN network, which may be owned by another company, will be minimized. In addition, the routing methodology will help "cap" the service provider's reliance on their own circuit switched networks, and allow their overflow and growth to be directed to the more cost effective VoIP (Voice over IP) network.

The method and system for optimally routing traffic in a heterogenous packet and circuit-switched network uses a table consisting of vertical and horizontal coordinates providing relevant location information.

Futhermore, the methodology and capabilities of the invention inherently give rise to the ability to allow a service provider to implement mostly duplicative call processing translation datasets across a multi-node network. This provides a natural environment for centralized administration which, in itself, has cost saving and error reduction benefits. Only the "localized" and node dependant datafill need to be maintained uniquely per softswitch node.

DETAILED DESCRIPTION

Figure 1:
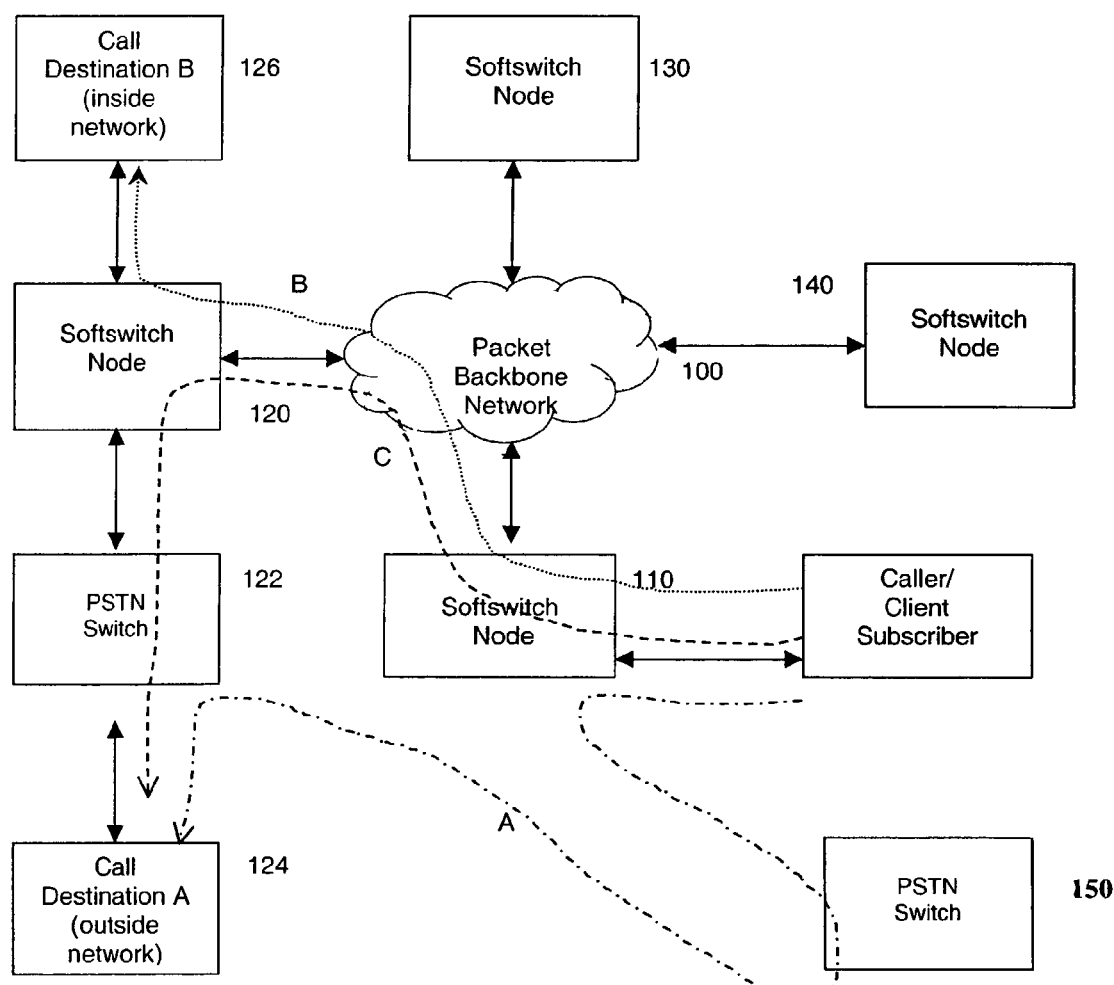
FIG. 1 depicts the architecture of a network implementation of the present invention.

FIG. 1 depicts the architecture of a network implementation of the present invention. In such an implementation, a plurality of call agents or softswitches exists at softswitch nodes 110, 120, 130 and 140.

Figure 2:
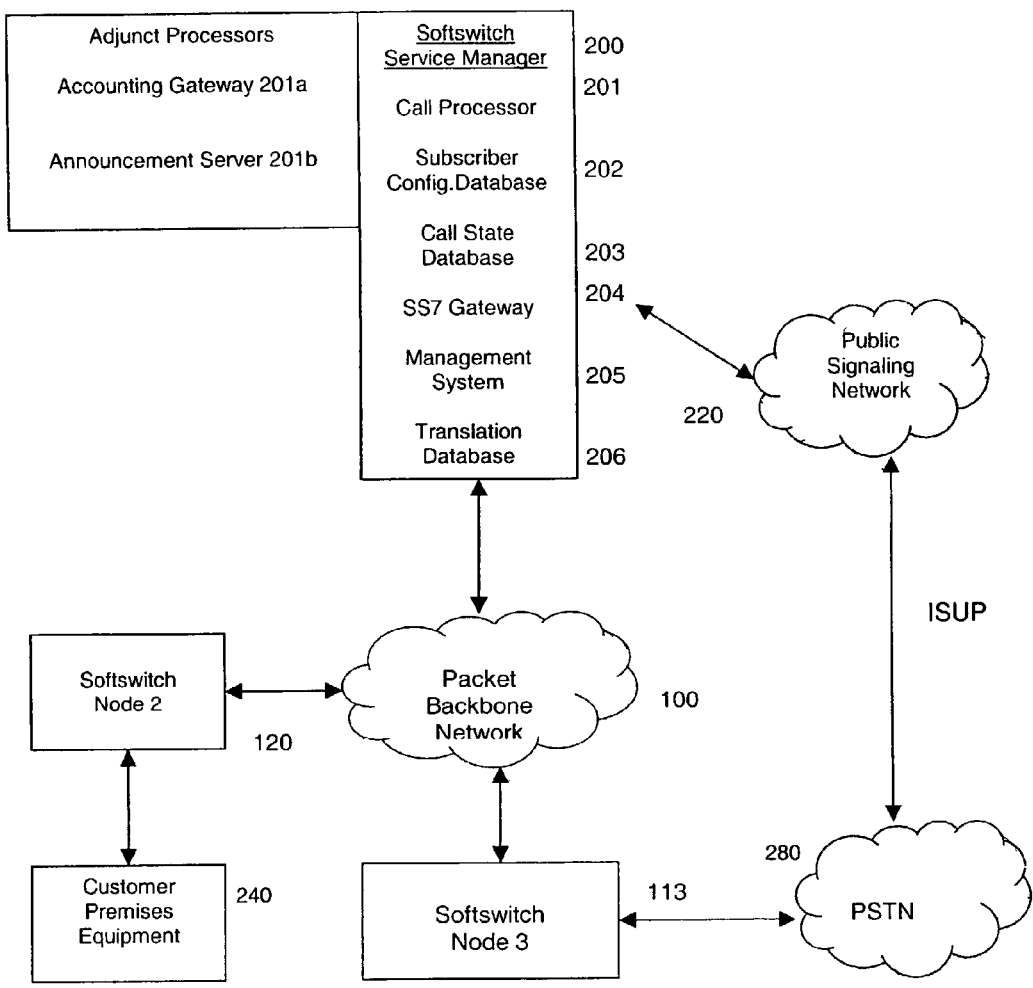
FIG. 2 depicts another embodiment of a network implementation of the present invention; and, FIGS. 3 and 4 depicts a flow diagram for the internodal routing engine of the present invention.

Each softswitch node could comprise a Telcordia™ service manager (SM) 200, as depicted in FIG. 2 as a computer capable of executing a number of software modules and providing certain database functions. A service manager 200 will typically include a call processor 201, a subscriber configuration database 202, a call state database 203, a Signaling System 7 (SS7) gateway 204 and a management system 205 supplemented by adjunct processors for an accounting gateway 201*a* and an announcement server 201*b*. The call processor 201 within the service manager 200 establishes, manages and terminates service by exchanging signaling messages with hub gateways and trunking gateways, stores call-related records and accounting data and routes calls to and from the Public Switched Telephone Network (PSTN) 280. Within the service manager 200 the subscriber configuration database 202 stores all subscriber data and the translation database 206 stores network configuration and call processing data, both share the data with the call processor to establish calls. The call state database 203 is a real-time subsystem that maintains a record of each call processed by the service manager 200 and stores subscriber feature information and network configuration data used during call processing to enable faster access and efficient routing. The SS7 gateway 204 serves as the interface between the service manager and the SS7 public signaling network 220 enabling completion of calls on the PSTN 280. The management system 205 serves as a graphical user or machine interface for system management provisioning and maintenance and provides users of the service manager 200 with the interface to the call treatment tables described below.

With each softswitch node 110, 120, 130 and 140 having the functionality of a service manager 200, FIG. 1 depicts a possible service provider network configuration. Caller/Client subscriber 112 is the site of the cutomer premises equipment (CPE) device used by the caller to place the call through a service provider. Softswitch node 110 is the location of the softswitch, owned by the service provider, that is nearest to the caller/client subscriber 112. The packet backbone network 100 is the packet switched network owned by the service provider. Softswitch node 120 is the location of the softswitch, owned by the service provider, that is nearest to both call destinations. Call destination 124 is outside the packet switched network and is accessed through a PSTN Switch 122. Call Destination B 126 is inside the service provider's packet-switched network. Softswitch nodes 130 and 140 are the locations of two other softswitches, owned by the service provider, that are not nearest to the call destination.

When a caller/client subscriber (such as caller/subscriber 112 in FIG. 1) makes a call to a destination (either within or outside of the subscriber's network) it is desirable to minimize the resources necessary to handle the traffic. Moreover, minimizing the utilization of an outside network (e.g. PSTN) is highly desirable. FIG. 1 depicts two scenarios:

1. Caller/client subscriber 112 needs to place a call to a destination inside the network (call destination 126) and
2. Caller/client subscriber 112 needs to place a call to a destination outside the network (call destination 124).

Even in this simplified network diagram, there are various ways of routing calls. For example, an inefficient way to route the call, as depicted by line A in FIG. 1, entails routing the call from caller/client subscriber 112 to softswitch node 110, to PSTN 150, then to PSTN 122, and finally to destination 124.

FIG. 1 also depicts two possible preferred traffic routing scenarios. The first scenario, depicted by line C, is from caller/client subscriber 112 to softswitch node 110 through the packet backbone network 100 through softswitch node 120 to the call destination 126. The second scenario, depicted by the line B, is from caller/client subscriber 112 to softswitch node 110 through the packet backbone network 100 through softswitch node 120 and PSTN switch 122 to call destination 124.

The present invention determines the most efficient routing path of a call based on the physical location of call destinations 122 and 124 in relation to the nearest softswitch node 120. Each call destination is assigned a set of vertical and horizontal location coordinates. The service provider's softswitch nodes will contain a database contained in translation database 206 of serivce manager 200. This database will store all softswitch node locations. Specifically, vertical and horizontal coordinates describing the locations of each of the softswitch nodes will be stored. The present method and system will determine which softswitch node location is nearest to the call destination by mathematically comparing the coordinates, and thus routing the call through the most efficient location with respect to the vertical and horizontal coordinates of the call attempt's softswitch node. Note that, in addition to finding the optimal route within the service provider's network, the system will also preclude the use of non-optimal routes (such as the route depicted by the line A) that will entail immediately routing the call from a caller/client subscriber to the PSTN switch closest to that caller/client subscriber, since this route increases the need to traverse the more expensive PSTN network, which may not necessarilly be owned by the service provider. Therefore, the optimal route will not only decrease the route within the service provider's softswitches and packet network, but will also minimize the need to use the PSTN network.

The present invention proposes a design to provide a method of optimizing the translations/routing of all North American Numbering Plan (NANP) voice call attempts that are served outside a softswitch (service manager) node's geographic serving area. This requires additional core-translations information that would be used to optimize the routing of these call attempts by taking better advantage of a company's network of softswitch nodes. The additional data would be used by a routing (translating) "engine" within service manager call processing software in order to produce the resultant routing information.

In order to determine how to optimally route a call targeted to a particular NPA-NXX, the routing engine will need to know the location of the call destination, i.e., the location of the called party, as well as the location of the nearest softswitch node owned by the service provider of the caller. This will entail storing location information for each NPA-NXX in the NANP, as well as location information for every softswitch node owned by the company. This location information is stored in a database in each softswitch node owned by the service provider. When a caller/client subscriber 112 calls a number associated with a call destination, i.e., the caller places a call, the softswitch call processing software would determine the closest softswitch node (owned by the service provider) to the call destination.

The closest softswitch node would be calculated using location/cost information, such as the vertical and horizontal (V&H) coordinates of the called number and those of the company's softswitch nodes. V&H coordinates are derived from geographic longitude and latitude coordinates and have traditionally been used as input to monthly billing calculations such as charges for leased circuits. In a packet switched network such as the packet backbone network 100 and associated softswitch nodes 110, 120, 130 and 140, the same V&H coordinates can be used to provide a mechanism for calculating distances between softswitch nodes and NPA-NXX locations to be used for routing. These coordinates are readily available in published databases such as Telcordia's LERG™ (Local Exchange Routing Guide) database, and are updated regularly. This information would be used with new core translations data, which can be readily shared between all of the company's softswitch nodes. Any service provider's softswitch nodes can be readily updated with this data. Because of the "datebase" to "database" basic datum relationship, automation of the update and growth datafill directly associated with the invention can be accomplished with relative ease.

Figure 3:
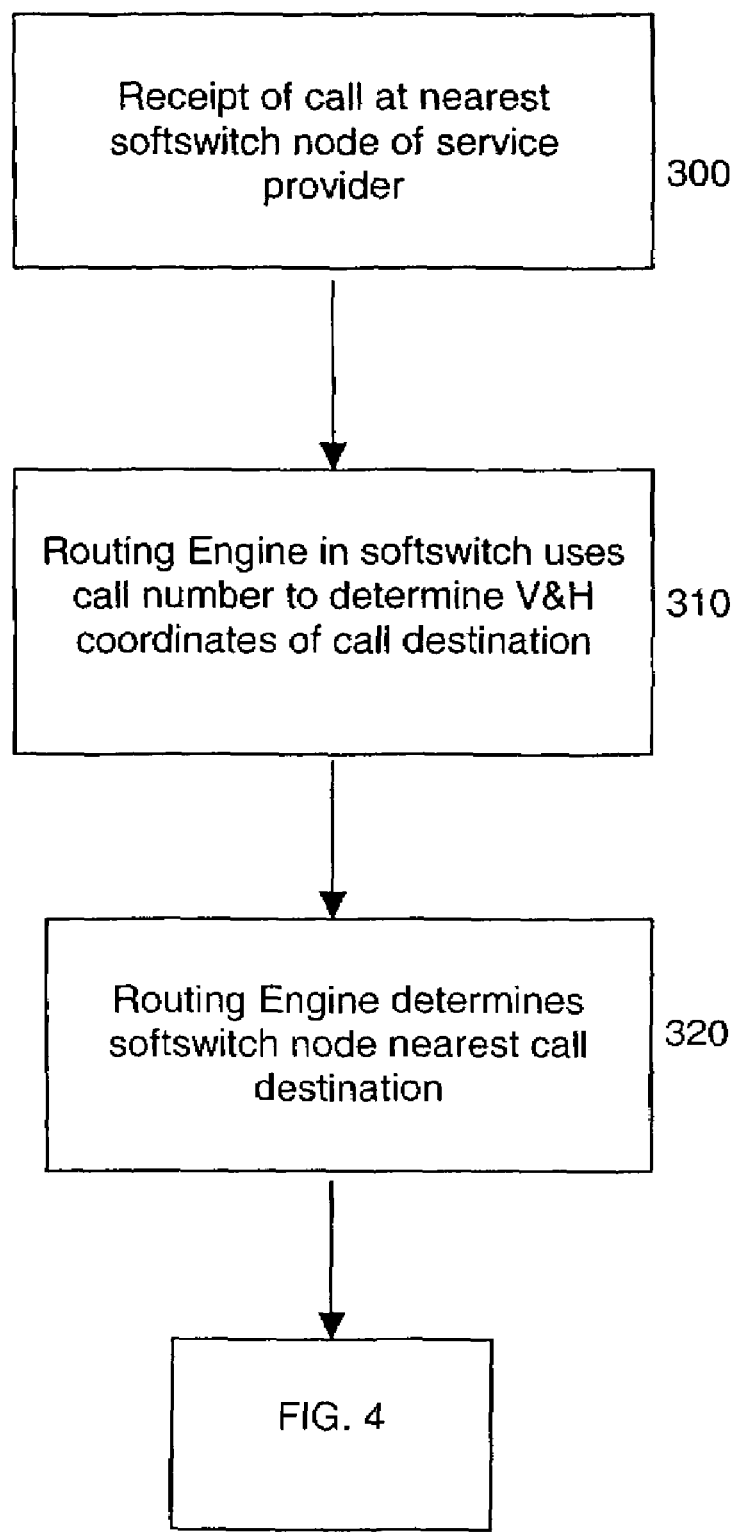
Figure 4:
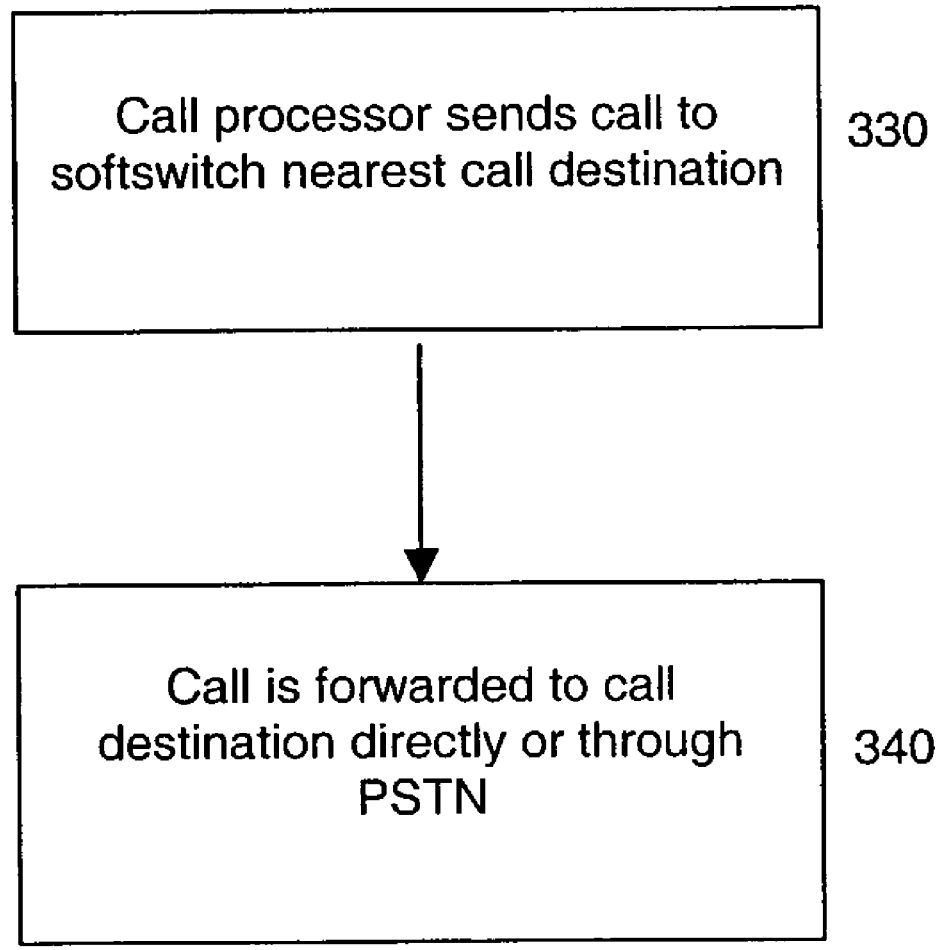

FIGS. 3 and 4 depict the processing flow within the call processor of the softswitch in order to implement a routing engine in accordance with the present invention. At step 300 the call originating at the caller/client subscriber 112 is received at softswitch node 110. At step 310, the call processor 201 in softswitch node 110 invokes the routing engine. The routing engine in the call processor uses the phone number of the call destination to determine the vertical and horizontal coordinates of the call destination within the network. This step may rely on use of the LERG database for location information. At step 320 the routing engine determines the softswitch node nearest the call destination. In the example in FIG. 1, the routing engine would choose softswitch node 120 as the nearest softswitch node of service provider.

At step 330 the call processor then routes the call to the call destination through the packet based backbone network 100 to the identified "closest" softswitch 120. Softswitch node 120 will then determine if the call can be completed at a call destination that is in communication with it or whether the call needs to be routed onto the PSTN. At step 340 the final forwarding occurs.

The proposed routing methodology has a number of benefits. It will be possible to minimize the use of an outside network (e.g. PSTN) by taking full advantage of the service provider's Voice Over Packet (VoIP) network. For example, prior to the proposed routing methodology, if a VoIP subscriber calls an off-net number (i.e. a number outside of the company's softswitch packet-based network), the subscriber's call could be immediately routed to the circuit switched network. This is depicted by line A in FIG. 1. With the proposed routing methodology, the call may instead be routed to another softswitch closer to the called party prior to routing it to the circuit switched (PSTN) network. This is depicted by line C. The latter approach would take better advantage of the company's packet based network.

The new routing methodology would help the company "cap" their circuit switched NANP network, and will allow their overflow and growth to be directed to the more cost effective VoIP network.

Information regarding NPA-NXX numbers that are reserved but have not yet "opened up" can also be stored so that costly routing that will merely give callers a treatment at the called side of the network may be prevented.

The current design intent is to provide the "routing engine" capabilities for all points within the North American Numbering Plan (NANP). The NANP is the numbering plan for the Public Switched Telephone Network in the United States and its territories, Canada, Bermuda, and many Caribbean nations, including Anguilla, Antigua & Barbuda, Bahamas, Barbados, British Virgin Islands, Cayman Islands, Dominica, Dominican Republic, Grenada, Jamaica, Montserrat, St. Kitts and Nevis, St. Lucia, St. Vincent and the Grenadines, Trinidad and Tobago, and Turks & Caicos. The methodology could easily be applied to different numbering plans.

Access to the NANP NPA-NXX vertical/horizontal coordinate data is needed. This information may be obtained from the LERG™ (Local Exchange Routing Guide) database. The LERG is produced by the Traffic Routing Administration (TRA) of Telcordia Technologies.

It is also assumed that the primary "cost" of routing a call is highly correlated to the distance between two points and the transport that is used. For maximum flexibility and capability, a service provider's softswitch nodes are fully interconnected and the VoIP network is virtually non-blocking.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated.

We claim:

1. A method for routing calls from a caller to a call destination in a heterogeneous packet-based and circuit-switched network, wherein the call is processed by a call processor forming part of one of a plurality of softswitches used to control calls within the packet-based portion of the network and to and from the circuit-switched portion of the network, comprising the steps of:
   determining, at the call processor in the softswitch receiving the call from the caller,
   the location of the call destination;
   identifying the softswitch nearest the call destination; and,
   routing the call to the identified softswitch.

2. The method of claim 1 further comprising the step of routing the call to the circuit-switched network if the call destination is not within the packet-based portion of the network.

3. The method of claim 1 wherein the step of determining comprises the steps of determining the vertical and horizontal coordinates of the call destination.

4. The method of claim 3 wherein the step of determining the vertical and horizontal coordinates of the call destination is accomplished by referring to the Local Exchange Routing Guide (LERG™) database.

5. The method of claim 2 wherein the circuit-switched network is the public switched telephone network (PSTN).

6. The method of claim 1 wherein the step of identifying the softswitch nearest the call destination is accomplished by comparing the location of the call destination with a database of location information for each softswitch in the packet-based portion of the network.

7. The method of claim 6 wherein the database of location information for each softswitch in the packet-based portion of the network is updated to reflect changes in the configuration of the network and softswitches within the network.

8. The method of claim 1 wherein the packet-based portion of the network is part of the service provider that provides service to the caller.

9. A system for routing calls from a caller to a call destination in a heterogeneous packet-based and circuit-switched network, wherein the packet-based portion of the network comprises a plurality of softswitches used to control calls within the packet-based portion of the network and to and from the circuit-switched portion of the network, comprising:
   a first softswitch in communication with the caller;
   means within said first softswitch for determining the location of the call destination and for identifying a second softswitch nearest the call destination using a database of softswitch location information;
   means for routing the call from the first softswitch to the identified second softswitch.

10. The system of claim 9 further comprising means for updating the database of softswitch location information.

11. The system of claim 9 wherein the database of softswitch location information contains the vertical and horizontal coordinates of each softswitch in the packet-based portion of the network.

12. The system of claim 9 wherein the means for identifying the location of the caller destination communicates with the Local Exchange Routing Guide (LERG™) database.

13. In a heterogeneous telecommunications network comprising a packet-based portion having a plurality of softswitches and a circuit-switched portion, a softswitch for the processing of calls received from a caller to a call destination comprising:
   a database of location information for each softswitch in the packet-based portion of the network;
   a means for determining the location of the call destination;
   a means for identifying the softswitch nearest the call destination; and,
   a means for routing the call to the softswitch nearest the call destination.

14. The softswitch of claim 13 wherein the database of location information comprises the vertical and horizontal coordinates of each softswitch in the packet-based portion of the network.

15. The softswitch of claim 14 wherein the vertical and horizontal coordinated are derived from geographic longitude and latitude of each softswitch.

16. The softswitch of claim 13 wherein the database of location information comprises only information on the softswitches operated by the service provider providing service to the caller.

* * * * *